(No Model.)
T. B. LANGFORD.
ORANGE CLIPPER.
No. 472,459. Patented Apr. 5, 1892.
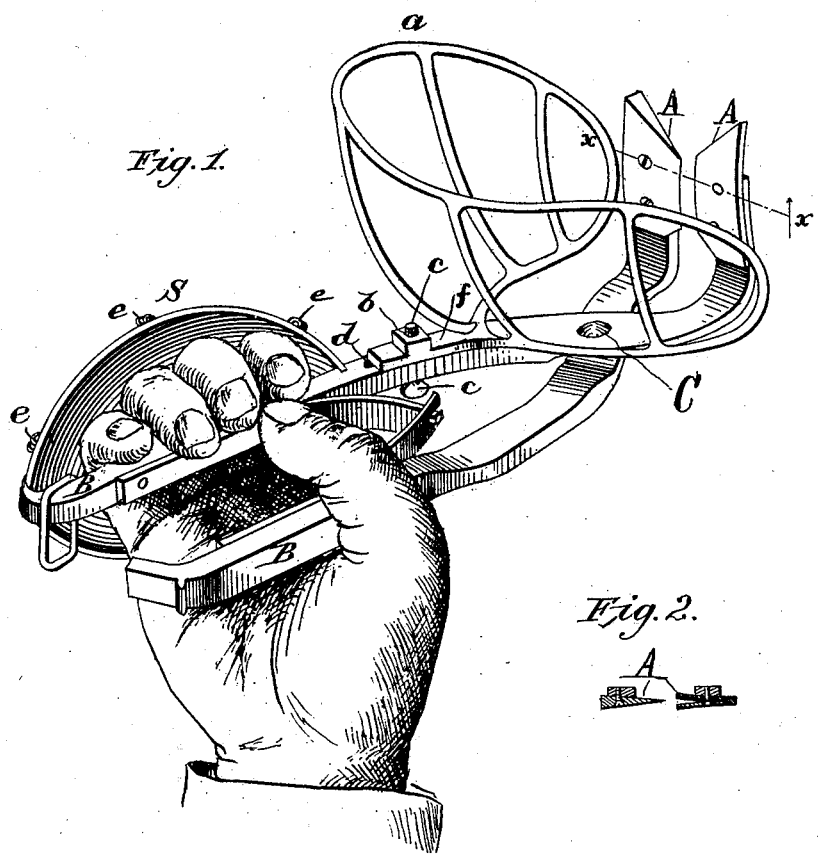
Witnesses:
Inventor:
Thos B Langford

UNITED STATES PATENT OFFICE.

THOMAS B. LANGFORD, OF FORT MEADE, FLORIDA.

ORANGE-CLIPPER.

SPECIFICATION forming part of Letters Patent No. 472,459, dated April 5, 1892.

Application filed December 26, 1890. Serial No. 376,419. (No model.)

*To all whom it may concern:*

Be it known that I, THOMAS B. LANGFORD, a citizen of the United States, residing at Fort Meade, in the county of Polk and State of Florida, have invented a new and useful Orange or Fruit Clipping Machine, of which the following is a specification.

My invention relates to improvements in orange-clippers in which the clipping, catching, and discharging are all done with the use of but one hand.

The object of my improvement is to provide a more rapid way of gathering oranges without bruising or otherwise injuring the same. I attain these objects by mechanism illustrated in the accompanying drawings, in which—

Figure 1 is a perspective view of my improved orange-clipper; and Fig. 2 is a sectional view of the cutting-blades, taken on line $xx$, Fig. 1.

In the drawings, A represents the cutting-blades of my improved fruit-gatherer, said blades being turned upward at substantially a right angle to the plane of movement of the handles B, the two sections which compose the clipper being pivoted at C.

$a$ represents the basket or catcher, which is constructed of wire, is basket-shaped, and is attached to one of the bars or handles of the clipper. The basket $a$ is open at the top, and is also open at the side next the upturned cutting-blades A, so that in plan view the basket or catcher has somewhat the shape of a horseshoe. In a projection $f$ on the end of the basket $a$, next to the hand-hold of the handle of the clipper, is a threaded hole $b$, through which passes a thumb-screw $c$, also passing through a slot $d$ in one of the bars or handles of the clipper, which slot is of sufficient length to allow the basket to be adjusted to admit any-sized orange grown.

The basket $a$ is adjusted to suit different-sized fruit by loosening the thumb-screw $c$ and sliding the basket toward the cutting-blades, as shown in Fig. 1, for small-sized fruit, and for large-sized fruit by moving the basket from the cutting-blades and toward the handle, stopping at the proper place to suit the size of orange to be clipped, and tightening the thumb-screw in either instance.

By reason of the peculiar shape of the basket, as described above, it may readily be seen that by moving the basket along the handle-bar the capacity of the fruit-receptacle may be increased or diminished, since the upturned cutting-blades form one side of the receptacle, and by varying the distance of the basket from the cutting-blades the length of the receptacle is increased, the width remaining constant.

The fruit is discharged when clipped by turning the clippers a little forward.

S represents the shield for the hand. It is made of tin and attached to one of the hand-holds B of the handle for protection from thorns.

$e\ e$ represent loops to which an arm-shield (not shown in drawings) may be attached, if desired.

The cutting-blades of my improved orange-clipper, the size of the machine, and the general principle of clipping are much the same as in the older styles, where both hands are required to do the work of clipping and discharging from the hand without any means of catching other than by hand.

What I do claim as my invention, and desire to secure by Letters Patent, is—

1. In a fruit-gatherer, a pair of shears having their cutting-blades turned upward at an angle to the plane of movement of the handle-bars, and having a receptacle for catching the fruit seated upon the upper side of the shears within the angle, substantially as described.

2. In a fruit-gatherer, a pair of shears having their cutting-blades turned upward at an angle to the plane of movement of the handle-bars, in combination with a fruit-receptacle seated upon the upper side of the shears, said receptacle having an open top and a lateral opening adjacent to the cutting-blades and having a longitudinal adjustment along the shears, whereby it is adapted to receive fruits of different bulk, substantially as described.

THOS. B. LANGFORD.

Witnesses:
MAX REIF,
S. G. HAYMAN.